March 4, 1969 J. BENSIMON 3,431,439
THERMIONIC ENERGY CONVERTER
Filed Nov. 17, 1965 Sheet 1 of 2
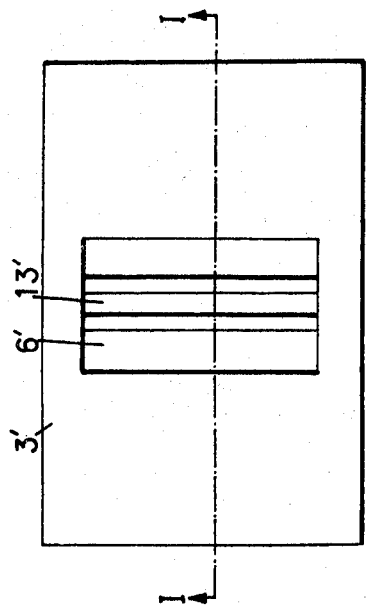
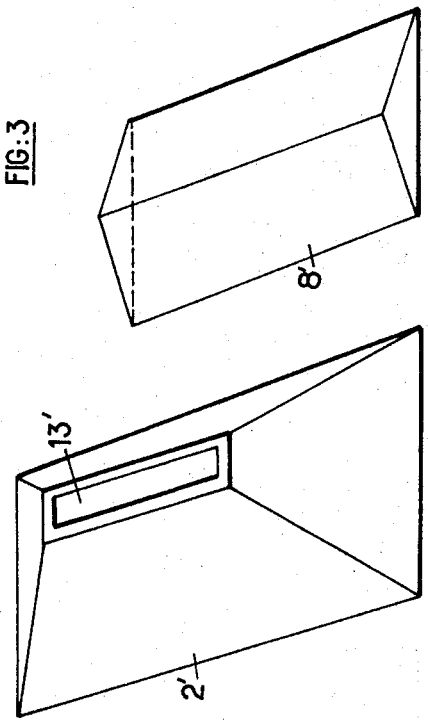
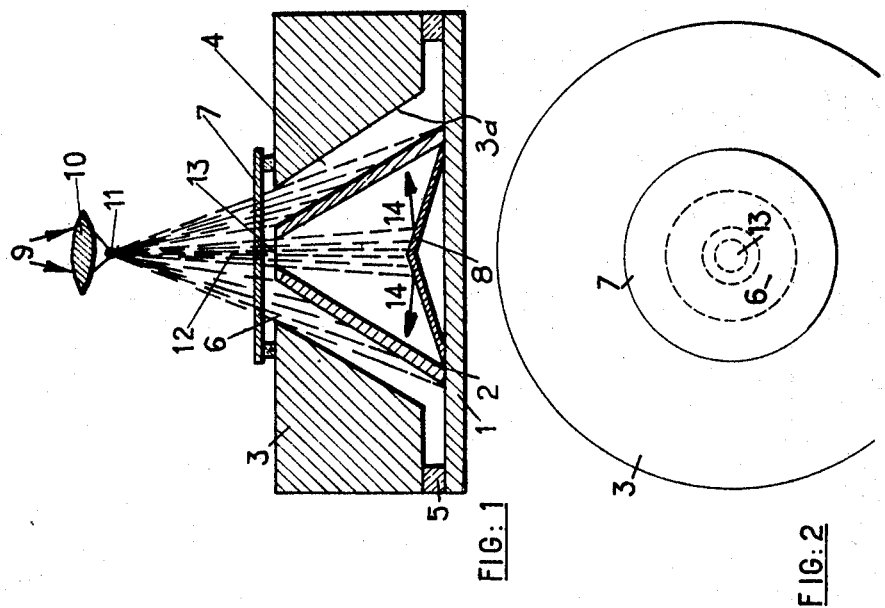
INVENTOR:
J. BENSIMON
BY Paul M. Craig, Jr.
ATTORNEY

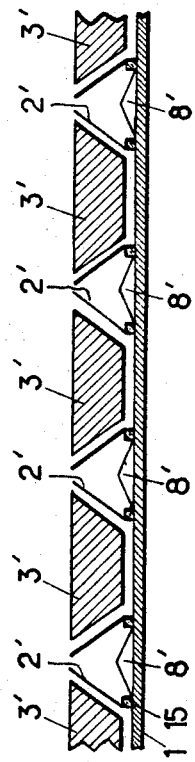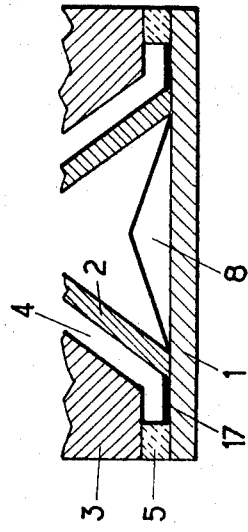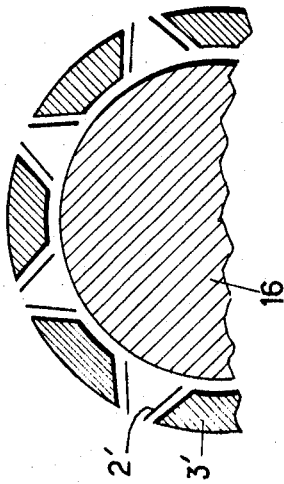

United States Patent Office 3,431,439
Patented Mar. 4, 1969

3,431,439
THERMIONIC ENERGY CONVERTER
Jacques Bensimon, Paris, France, assignor to CSF—Compagnie Generale de Telegraphie Sans Fil, a corporation of France
Filed Nov. 17, 1965, Ser. No. 508,343
Claims priority, application France, Dec. 1, 1964, 996,939
U.S. Cl. 310—4          18 Claims
Int. Cl. H02n *3/00;* H01m *15/02*

ABSTRACT OF THE DISCLOSURE

A thermoelectronic energy converter as disclosed in U.S. Patent No. 3,313,961, characterised in that a major part of the density-concentrated radiant energy is utilized for heating the emitter, and a minor part only is lost in heating the collector.

---

The present invention relates to direct thermoelectronic converters for directly converting thermal energy into electrical energy, more particularly of the type disclosed in the copending application Ser. No. 322,100, now U.S. Patent 3,313,961, filed on Nov. 7, 1963, by Jacques Bensimon and Pierre Laures, and assigned to the same assignee.

The thermoelectronic converter as described in the aforementioned application is of the volume-ionization type of a body such as low pressure cesium vapor filling a vacuum-tight enclosure between an emitter and a collector of electrons, and includes means for admitting into the enclosure the radiation of a source of heat and luminous energy, having as its function simultaneously to heat the emitter and to facilitate, by action of the photons of said energy, ionization of the atoms of the filling body, light reflecting means being provided within the enclosure for concentrating the volume density of the luminous energy.

However, in this prior device the incident energy flow was relatively poorly utilized since it heated the collector electrode relatively strongly so that the collector was carried at a relatively excessive temperature, while the photons contained in the energy lost for heating the collector were not utilized for enhancing ionization of the filling body.

According to the present invention, the electrode system and the reflecting means of a converter of the type described are arranged in such a manner that a major part of the density-concentrated luminous energy is utilized for heating the emitter, and a minor part only is lost in heating the collector, thereby avoiding the drawbacks explained above.

The electrode system of the converter according to the present invention includes an emitter in the form of a hollow body with a divergent surface, such as a cone or a prism, facing the internal wall of the collector. In the vertex of the cone, or in the edge of the prism, and also in the collector near this vertex or edge, there is provided an aperture or a slot for admitting luminous energy into the internal space of the emitter. The reflecting means are disposed within this internal space. The light beam is concentrated to enter into the converter in a conical or prismatical shape, a major portion of this beam penetrating into the internal space of the emitter and being subjected therein to reflections on the reflecting means, while a minor portion of the same beam penetrates into the interelectrode space to enhance ionization of the filling body.

This feature can be combined with reflecting means for that portion of incident energy which irradiates the interelectrode space, as provided per se in the aforesaid prior application. Moreover, with the arrangement as described it is especially easy to connect several converters in series, particularly in the prismatical embodiment. Such grouping of converters can be made on a support in the form of plate, sphere or cylinder.

Accordingly, it is an object of the present invention to provide an energy converter of the type described above in which the drawbacks experienced with the prior art devices are substantially eliminated.

Another object of the present invention is to provide a converter in which the collector electrode is subjected to a relatively slight heating by the incident luminous energy, which is used mainly to heat the emitter electrode, thereby increasing the efficiency and overall performance of the device.

A still further object of the present invention is a converter realized in such a manner as to be easily connected in series with other converters on a common support.

These and other objects, features and advantages of the present invention will become more obvious from the following description when taken in connection with the accompanying drawing which shows, for purposes of illustration only, several embodiments in accordance with the present invention, and wherein FIGURE 1 is an axial cross sectional view of one embodiment with rotational symmetry of a converter according to the present invention;

FIGURE 2 is a top plan view of the converter of FIGURE 1;

FIGURE 3 is a top plan view of a second embodiment having rectangular shape, the transverse cross sectional view thereof, taken along I—I in FIGURE 3, being identical to FIGURE 1;

FIGURE 4 is a perspective view of a component of the converter of FIGURE 3;

FIGURE 5 is a perspective view of another component of the converter of FIGURE 3;

FIGURE 6 shows diagrammatically several converters of the type illustrated in FIGURE 3, disposed on a plane support and connected in series;

FIGURE 7 shows diagrammatically an arrangement as in FIGURE 6, with the difference consisting of the curved shape of the support for the converters; and FIGURE 8 is an axial cross sectional view of a further development of the converter as shown in FIGURE 1.

Referring now to the drawing wherein like reference numerals are used throughout the various views to designate like parts, and more particularly to FIGURES 1 and 2, there is shown a metal plate 1 supporting the emitter electrode 2 of the converter. This electrode 2 is of hollow frusto-conical shape and is made, for instance of a refractory metal such as tantalum, or of a base metal coated with a layer of a substance having a relatively small work function, such as used in the well known art of impregnated cathodes. However, this work function although relatively small must still be higher than the work function of the collector electrode 3 in the operating conditions which include different temperatures of the two electrodes and different affinities of their materials with respect to the ionizable substance recovering their surfaces. The emitter 2 is surrounded by a collector 3, for instance of nickel, in which there is provided a hollow frusto-conical space defined by walls 3a parallel to the frustum of the cone 2 so that interelectrode space 4 is formed between these walls 3a and the external surface of the emitter 2. The collector 3 is tightly secured to the support 1 through an insulating ring 5. The small base 6 of the hollow space in the collector 3 is closed by a window 7, for instance of sapphire, having its edge tightly secured to the collector 3. A hollow cone 8, having a reflecting surface, is provided on the support 1 within the interior of the emitter 2. The internal space of the cone 8 is preferably evacuated for obtaining an improved thermal insulation. The vacuum tight enclosure comprising the space 4 between the support 1 and the window 7, and also the internal space of the frustum of the cone 2 externally to the cone 8, is filled with an ionizable body in gaseous state under relatively low pressure, such as for example cesium vapor.

A soure of light, having its spectrum filtered in needed, is located at 9. The light passes through an appropriate conventional optical system 10 to produce from the point 11, a light beam diverging in the form of cone 12 and penetrating through the window 7 with a minor part thereof through the passage 6 into the interelectrode space 4, and with its major part through the aperture 13 in the vertex of the emitter 2 into the internal space of this emitter, thus undergoing reflections on the cone 8. The reflected light energy is directed along arrows 14 toward internal walls of the frustum of cone 2, thereby heating the emitter 2 to carry it at an appropriate temperature for emission of electrons. At the same time, the collector 3 is heated to a relatively much lesser extent by the incident part of luminous energy since, if the opening angle of cone 12 is smaller than the opening angle of cone 2, as shown in the drawing, the rays of light penetrating into the space 4 fall or impinge mainly on the external surface of the emitter 2, and only to a small extent on the internal surface of the collector 3. In this manner there is obtained between the emitter 2 and the collector 3 a temperature difference which is sufficiently high for achieving a good efficiency of the converter. At the same time, the atoms of cesium vapor in the space 4 and also in the interior of the frustum of cone 2 are excited by the photons of luminous energy so that volume ionization is facilitated as has been explained in the aforesaid copending patent application. As a result thereof, the space charge compensation, which is a known condition for a correct operation of converters of the type described, is more effective. The efficiency of the converter is increased so that the power collected as usual between the collector 3 and the emitter 2 is higher than in other known converters, assuming equality of all other parameters.

FIGURE 3 shows in top plan view an alternative wherein the form with a rotational symmetry of FIG. 2 has been replaced by a rectangular form. In this view, the closing window of sapphire has been omitted for sake of clarity. The transverse cross-section of this alternative, along I—I in FIGURE 3, is identical to the showing of FIGURE 1. The frustum of cone 2 is replaced by a truncated prism or pyramid 2', shown in perspective view in FIGURE 4 and having a slot 13' instead of circular aperture 13. The hollow space in the collector 3' is now prismatic or pyramidal, with a rectangular opening 6' replacing the circular opening 6. The cone 8 is replaced by a prism 8' shown in perspective view in FIGURE 5. A conventional optical system 10 will be adapted to produce a prismatical instead of conical beam 12. Otherwise, the operation and the advantages of converters according to this alternative are the same as in the previously described one.

However, this alternative has the further advantage consisting of the convenience of making a series connection of several converters. FIGURE 6 shows diagrammatically a series arrangement of a group of converters according to FIGURE 3, on a common plane support 1. The collector 3' of each converter is combined with the collector of adjacent converters. The emitters 2' are insulated from the support 1 by insulating bars 15 to avoid short-circuiting of successive emitters when connected in series. It is obvious that several series connected groups could also be connected in parallel.

FIGURE 7 shows diagrammatically an alternative wherein the converters are grouped upon a support 16 having a curved surface, for instance spherical or cylindrical, instead of the plane support 1 of FIG. 6.

Finally, FIGURE 8 provides a combination of the features described above with those disclosed in the aforesaid copending patent application and consisting of reflecting means 17 for luminous energy disposed within interelectrode space itself.

Thus, FIGURE 8 shows a part of FIGURE 1 which has been completed by a reflecting metallization 17 on the support 1 at the bottom of interelectrode space 4 to thereby concentrate the volume density of luminous energy, as provided for in the copending application.

While I have shown and described several embodiments in accordance with the present invention, it is understood that the same is not limited thereto but is suspectible of numerous changes and modifications as known to a person skilled in the art, and I therefore do not wish to be limited to the details shown and described herein, but intend to cover all such changes and modifications as are encompassed by the scope of the appended claims.

I claim:

1. An energy converter having vacuum-tight enclosure means, comprising emitter electrode means operable to emit electrons into said enclosure means upon application of heat to said emitter electrode means, collector means adapted to collect the electrons emitted from said emitter means and separated from the said emitter means by an interelectrode space, an ionizable substance in gaseous state at relatively low pressure within said enclosure means, means for admitting into said enclosure means a flow of radiant energy including heat and photons including means for applying a major portion of said flow to said emitter electrode means for utilizing a major part of heat to heat said emitter electrode means and for simultaneously introducing a minor portion of said flow into said interelectrode space for enhancing by said photons ionization of said substance by the electrons emitted from said emitter electrode means, wherein said emitter means has a hollow diverging shape and is provided with an aperture in its vertex, said collector means having internal walls substantially parallel to said emitter means, and said radiant energy admitting means including means for forming a diverging light beam and for directing said diverging light beam through said aperture with a major portion thereof into the interior of said hollow emitter means and with a minor portion thereof into said interelectrode space.

2. A converter as claimed in claim 1, wherein the opening angle of said light beam is smaller than the opening angle of said diverging emitter means.

3. A converter as claimed in claim 2, further comprising light reflecting means within the interior of said hollow emitter means.

4. A converter as claimed in claim 3, further comprising light reflecting means within said interelectrode space.

5. A converter as claimed in claim 4, wherein said (first-mentioned) light reflecting means is constituted by the external surface of a substantially conical body.

6. A converter as claimed in claim 5, wherein said conical body is a hollow cone.

7. A converter as claimed in claim 6, wherein the hollow space of said cone is evacuated.

8. A converter as claimed in claim 1, further comprising light reflecting means within the interior of said hollow emitter means.

9. A converter as claimed in claim 8, further comprising light reflecting means within said interelectrode space.

10. A converter as claimed in claim 8, wherein said (first-mentioned) light reflecting means is constituted by the external surface of a substantially conical body.

11. A converter as claimed in claim 10, wherein said conical body is a hollow cone.

12. A converter as claimed in claim 11, wherein the hollow space of said cone is evacuated.

13. A converter as claimed in claim 1, wherein said emitter and collector means are of rotational symmetry structure.

14. A converter as claimed in claim 1, wherein said emitter and collector means are of prismatical structure.

15. A series connected arrangement of a number of converters as claimed in claim 14, wherein said collector means of all converter are combined into a single body, and wherein a common support forms part of their vacuum-tight enclosures.

16. An arrangement as claimed in claim 15, wherein said support is plane.

17. An arrangement as claimed in claim 15, wherein said support is cylindrical.

18. An arrangement as claimed in claim 15, wherein said support is spherical.

References Cited

UNITED STATES PATENTS

| | | | |
|---|---|---|---|
| 3,026,439 | 3/1962 | Geer | 322—2 XR |
| 3,218,196 | 11/1965 | Jensen et al. | 136—89 |
| 3,313,961 | 4/1967 | Bensimon et al. | 310—4 |

J. D. MILLER, *Primary Examiner.*

D. F. DUGGAN, *Assistant Examiner.*

U.S. Cl. X.R.

136—89